(12) United States Patent
Murakami

(10) Patent No.: US 8,145,771 B2
(45) Date of Patent: Mar. 27, 2012

(54) NAME SYSTEM IN COMMUNICATION NETWORK, AND NAMING METHOD

(75) Inventor: Homare Murakami, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 381 days.

(21) Appl. No.: 12/279,475

(22) PCT Filed: Feb. 15, 2007

(86) PCT No.: PCT/JP2007/052707
§ 371 (c)(1),
(2), (4) Date: Dec. 31, 2008

(87) PCT Pub. No.: WO2007/094398
PCT Pub. Date: Aug. 23, 2007

(65) Prior Publication Data
US 2009/0222566 A1    Sep. 3, 2009

(30) Foreign Application Priority Data
Feb. 15, 2006    (JP) ................................ 2006-038669

(51) Int. Cl.
*G06F 15/16*    (2006.01)
(52) U.S. Cl. ........................................ 709/228; 709/229
(58) Field of Classification Search .................. 709/228, 709/229
See application file for complete search history.

(56) References Cited

U.S. PATENT DOCUMENTS

| 7,260,598 B1 * | 8/2007 | Liskov et al. ................. 709/201 |
| 7,693,959 B2 * | 4/2010 | Leighton et al. .............. 709/217 |
| 2006/0195609 A1 * | 8/2006 | Han ............................. 709/245 |

FOREIGN PATENT DOCUMENTS

| JP | 2003-258832 | 9/2003 |
| JP | 2004-128727 | 4/2004 |

OTHER PUBLICATIONS

Homar Murakami, Rasmus Lovenstein Olsen, Hans-Peter Schwefel, Ramjee Prasad; A study of future name system considering devices in PANs; The Institute of Electronics, Information and Communication Engineers Sogo Taikai B-15-23, Mar. 7, 2005.
Motoki Nakamura; "Name Services for Large-Scale Distributed Systems"; The Transactions of the Institute of Electronics, Information and Communication Engineers D-I, vol. J81-D-I, No. 3, pp. 233 to 243, Mar. 25, 1998.
Homare Murakami, Rasmus Lovenstein Olsen, Hans-Peter Schwefel, Ramjee Prasad; "A study of a naming scheme for user centric environment"; IPSJ SIG Technical Report; 2006-MBL-36 (68); 2006-UBI-10 (68); Feb. 17, 2006 (8 pgs).
Homare Murakami, Rasmus Lovenstein Olsen, Hans-Peter Schwefel, Ramjee Prasad; "2-layers architecture of user-centric name system";2006 The Instutute of Electronics, Information and Communication Engineers Sogo Taikai B-7-167, Mar. 8, 2006; p. 263.

(Continued)

*Primary Examiner* — Adnan Mirza
(74) *Attorney, Agent, or Firm* — Sampson & Associates, P.C.

(57) ABSTRACT

A name system and method in a communication network, includes a technique for implementing naming in which security is ensured in an Internet environment and a personal network in which a user can access his own device or data.

8 Claims, 13 Drawing Sheets

OTHER PUBLICATIONS

Homare Murakami, Rasmus Lovenstein Olsen, Hans-Peter Schwefel, Ramjee Prasad, "A study of naming scheme accepting ambiguous description", National Institute of Information and Communications Technology, Aalborg University, Denmark. (2 pgs).

Homare Murakami, Rasmus Lovenstein Olsen, Hnas-Peter Schwefel, Ramjee Prasad; "User-centric Name Services for Personal Networks"; Center of TeleInFrastruktur, Aalborg University, Aalborg Ost, Denmark and Yokosuka Radio Communication Research Center, National Institute of Information and Communications Technology, Yokosuka, Kanagawa, Japan (5 pgs).

Majid Ghader, Rasmus L. Olsen, Marc Girod Genet, Rahim Tafazolli; "Service Management Platform for Personal Networks", within the project "My adaptive Global NET; MAGNET", running under the 6th framework program performed by Information Society Technologies (IST) under the contract No. 507102; (5 pgs).

Homare Murakami, Rasmus Lovenstein Olsen, Hans-Peter Schwefel, Ramjee Prasad, Managing Personal Network Specific Addresses in Naming Schemes; IWS 2005; pp. 1-5.

William Adjie-Winoto, Elliot Schwartz, Hari Balakrishnan, and Jeremy Lilley;"The design and implementation of an international naming system"; 17th ACM Symposiium on Operating Systems Principles (SOSP '99); Operating Systems Review, 34 (5); 286-201, Dec. 1999.

P. Mockapetris, "Domain Names — Concepts and Facilities"; ISI, Nov. 1987, one page.

P. Vixie, S. Thomson, Y. Rekhter, J. Bound; "Dynamic Updates in the Domain Name System (DNS UPDATE)"; Standards Track; one page.

* cited by examiner

NAME SYSTEM IN COMMUNICATION NETWORK, AND NAMING METHOD

BACKGROUND OF THE INVENTION

1. Field of the Invention

The present invention relates to a name system in a communication network, and a naming method, and particularly relates to a technique for implementing naming in which security is ensured in an Internet environment and a personal network in which a user can access his own device or data.

2. Description of the Related Art

Rapid progress is being made in ubiquitous communication environments for melding real space with a network, whereby real-space information of an RF-ID or sensor is obtained by a network, household appliances having network connectivity are controlled via a network, and other effects are obtained.

The speed and capacity of both wired and wireless communication networks are also rapidly increasing, and flat rate services are being introduced that to not depend on communication time or communication charges. Through a combination of these services, it has become possible for users to easily remotely operate a home or office device and retrieve necessary information via a network from any location.

Although convenience to the user increases in such an environment, a high degree of knowledge may be required of the user due to the complexity of the system, and danger may occur at the same time in that the likelihood of unexpected access to one's device or information by third parties may increase due to setting errors, system failures, or the like.

There is therefore a need for a system that is designed so that security problems do not occur and setup is easy or unnecessary.

When an extremely large number of devices are connected to a network, there must be a means for one to discover/specify a service to use or a device to connect to. For example, when a user wishes to record a television program that is to be broadcast the same night, the user must perform a reservation operation in a home video deck. At this time, even if the video deck itself is connected to a network, indicating the video deck by a character string or a number string such as an IP address still makes it difficult for the user to discover and operate the video deck from the network.

This problem may be overcome from two directions. One is to give a name to each device that is easily recognized by the user and is separate from the address. Nonetheless, since packet transfer depends on the address during actual communication, there is always a need for the user to memorize the address list by keeping a list of correlations (bindings) between the addresses and names of the devices, and performing an appropriate conversion between names and addresses. This arrangement is referred to as naming.

Another method for overcoming the abovementioned problem is to register the "capability" (service) of each device in advance in a specific server. When a user issues a request to the service for a desired action, e.g., "record television program," the server searches for a device that provides a service that matches the request, and responds with the information, whereby the user can access the appropriate device. This arrangement is referred to as service discovery.

Service discovery techniques are generally more complex than naming techniques, and it is therefore considered difficult to ensure scalability.

These two types of techniques are not exclusive, and convenience to the user can be even further improved by combining the use of these techniques. For example, among techniques proposed in the past, an Intentional Name system (INS) (see Non-patent Document 1) has characteristics of both the abovementioned techniques.

In an INS, naming elements of each device include the position of the device, the type of service, the access characteristics, and the like, and the naming elements form a tree structure, whereby a user can easily discover a desired service that exists nearby. However, since propagation/sharing of name space is performed on a hop-by-hop basis, scalability on the Internet level is difficult to ensure.

In the present Internet, the Domain Name System (DNS) (see Non-patent Document 2) is utilized as the de facto standard name system.

DNS has a hierarchical naming space, and a name is composed of a combination of a device name and a domain (system) name. In the name "www.nict.go.jp," for example, the "www" is the device name, and the "nict.go.jp" portion is the domain name. The domain name portion has a hierarchized structure (in the aforementioned example, jp→go→nict), and the name servers of each system are structured so as to have the same hierarchical structure. Device names can thereby be managed independently within each system, and Internet-size scalability is acquired through distributed accommodation in a hierarchical structure even when the number of domains or devices increases.

It would be preferable for DNS to continue to be used in the next-generation network that is the subject of the present invention, but several functions needed in the next-generation network would then be impossible to provide.

First, movement of the user is assumed in the next-generation network. Particularly in devices existing on a PAN, connection points on the Internet (or an IP-based backbone network) continue to change while the Radio Access Network (RAN, e.g., Ethernet (registered trademark), wireless LAN 802.11g, W-CDMA (registered trademark), and other access schemes) frequently changes according to movement of the device. The new connection point then does not necessarily belong to the same domain. In DNS, since the name of the device depends on the connection point, this name cannot be considered to essentially follow the mobility of the device.

A drawback of applying DNS to the next-generation network is that the information of all the devices is basically disclosed. An advantage of DNS is that all devices can be accessed by a user using a simple name when the devices are connected to the network. However, a name registered in DNS can also be referenced by another user, and assigning a common name or an easily guessed name to a device may unnecessarily invite access by other users. This is not expected to be a problem insofar as access control is appropriately set, but it is preferred from a management perspective that information of devices meant for personal use not be displayed to others.

Patent Document 3 discloses a system and method as a related conventional technique to search for a device on a local area network.

This system includes an address server for associating IP addresses of devices on the network with a group name, and a discoverable device located on a first subnet of the network, wherein the discoverable device has an IP address, the IP address of the discoverable device being associated with the group name; and a discovering device, located on a second subnet of the network, for creating a list of known subnets and known devices on the network, querying a name server for a list of IP addresses associated with the group name, contacting each returned address of a discoverable device associated with the group name for the IP subnet information of the discoverable device, determining the subnet of the discoverable device, and adding the discoverable device and the subnet of the discoverable device to the list.

[Non-patent Document 1]: W. Adjie-Winoto, et al., "The design and implementation of an intentional name system," *Proc. Of ACM SOSP '99*, pp. 186-201, December 1999.

[Non-patent Document 2]: P. Mockapetris, "Domain Names-Concepts and Facilities," *IETF RFC* 1034, November 1987.

[Patent Document 3]: Japanese Laid-open Patent Application No. 2003-258832

SUMMARY OF THE INVENTION

The present invention was developed in view of the drawbacks of the prior art described above, and an object of the present invention is to provide a name system and naming method in which the mobility or address of a device is not needlessly disclosed to another party, while maintaining superiority of DNS.

The present invention provides a name system such as described below in order to overcome the abovementioned drawbacks.

Specifically, a first aspect of the present invention is a name system for correlating a device and a network address on a communication network, wherein the name system forms a first name system layer for registering only a device for which access from another party is permitted, and forms a second name system layer for registering a device that can be accessed only by a user having specified access authority.

In this configuration, a name server device for functioning in both of the name system layers is provided for each cluster defined as a collection of devices for each location in the second name system layer, acquires device registration information that includes at least a network address and type of a device from one or more devices in the cluster, and stores a correspondence list of the devices and addresses in the cluster.

The name server device has a link for exchanging the correspondence list with a name server device of another cluster within the second name system layer, and enables the user having specified access authority to access a device of any cluster.

In the first name system layer, the name server device connects to a function addition name server device constituting a hierarchical domain, provides the correspondence list for a device for which access from another party is permitted in the second name system layer, and enables access to a device belonging to the domain from the other party to be attained through device/network address conversion of the function addition name server device.

In the name system according to a second aspect, in a case in which a home name server device, which is the function addition name server device for managing a domain of a home network to which a user belongs, and the access-point name server device, which is the function addition name server device to which the name server device of the cluster in which the user is currently positioned is connected, are different from each other in the first name system layer, the name server device provides a correspondence list for a device for which access from another party is permitted to the access-point name server device.

The access-point name server device also transmits the network address of the access-point name server device and information of a device that received the correspondence list to the home name server device, and notifies the other party of the network address of the access-point name server device when access to a device addressed to the home name server device has occurred.

In a third aspect of the present invention, the device registration information includes a public setting flag for setting whether the device is disclosed in the first name system layer, and a device name of the device at the time of disclosure.

In a fourth aspect of the present invention, the name server device comprises processing means for supplementing a cluster name in the second name system layer when a defect is present in a received cluster name.

In a fifth aspect of the present invention, the name server device comprises processing means for supplementing a device name existing in a specified cluster in the second name system layer when a defect is present in a received device name.

The present invention can also provide a naming method as described below.

Specifically, a sixth aspect of the present invention is a naming method for correlating a device and a network address on a communication network, wherein the naming method forms a first name system layer for registering only a device for which access from another party is permitted, and forms a second name system layer for registering a device that can be accessed only by a user having specified access authority.

The naming method also comprises the steps of: providing a name server device for functioning in both of the name system layers for each cluster defined as a collection of devices for each location in the second name system layer, acquiring device registration information that includes at least a network address and type of a device from one or more devices in the cluster, and storing a correspondence list of the devices and addresses in the cluster; exchanging the correspondence list with a name server device of another cluster within the second name system layer, and enabling the user having specified access authority to access a device of any cluster; connecting to a function addition name server device constituting a hierarchical domain in the first name system layer, and providing the correspondence list for a device for which access from another party is permitted in the second name system layer; and enabling access to a device belonging to the domain from the other party to be attained through device/network address conversion of the function addition name server device.

A seventh aspect of the present invention comprises a step in which the name server device provides a correspondence list for a device for which access from another party is permitted to the access-point name server device in a case in which a home name server device, which is the function addition name server device for managing a domain of a home network to which a user belongs, and the access-point name server device, which is the function addition name server device to which the name server device of the cluster in which the user is currently positioned is connected, are different from each other in the first name system layer; and a step in which the access-point name server device transmits the network address of the access-point name server device and information of a device that received the correspondence list to the home name server device, and the home name server device notifies the other party of the network address of the access-point name server device when access to a device addressed to the home name server device has occurred.

In an eighth aspect of the present invention, the device registration information includes a public setting flag for setting whether the device is disclosed in the first name system layer, and a device name of the device at the time of disclosure.

A ninth aspect of the present invention provides a naming method in which the name server device comprises processing means for supplementing a cluster name in the second name system layer when a cluster name is not present in a received cluster name, a portion is missing, or another defect is present.

In a tenth aspect of the present invention, the name server device comprises processing means for supplementing a device name existing in a specified cluster in the second name system layer when a received device name is not present, a portion is missing, or another defect is present.

The present invention demonstrates such effects as the following by virtue of the configuration described above.

Specifically, through the use of two name system layers, a private name space and a public name space can be separated, and the addresses of the private name space are not disclosed to the public name space.

Unauthorized access from another party can thereby be prevented without disclosing device information.

The name server device of a cluster being moved to provides a correspondence list to the access-point name server device, and the access-point name server device and the home name server device operate in coordinated fashion, whereby a naming technique can be provided that is adapted to user movement.

Public information in the first name system layer can easily be set by including a public setting flag and the device name of the device at the time of disclosure in the device registration information.

DESCRIPTION OF THE PREFERRED EMBODIMENTS

Figure 1:
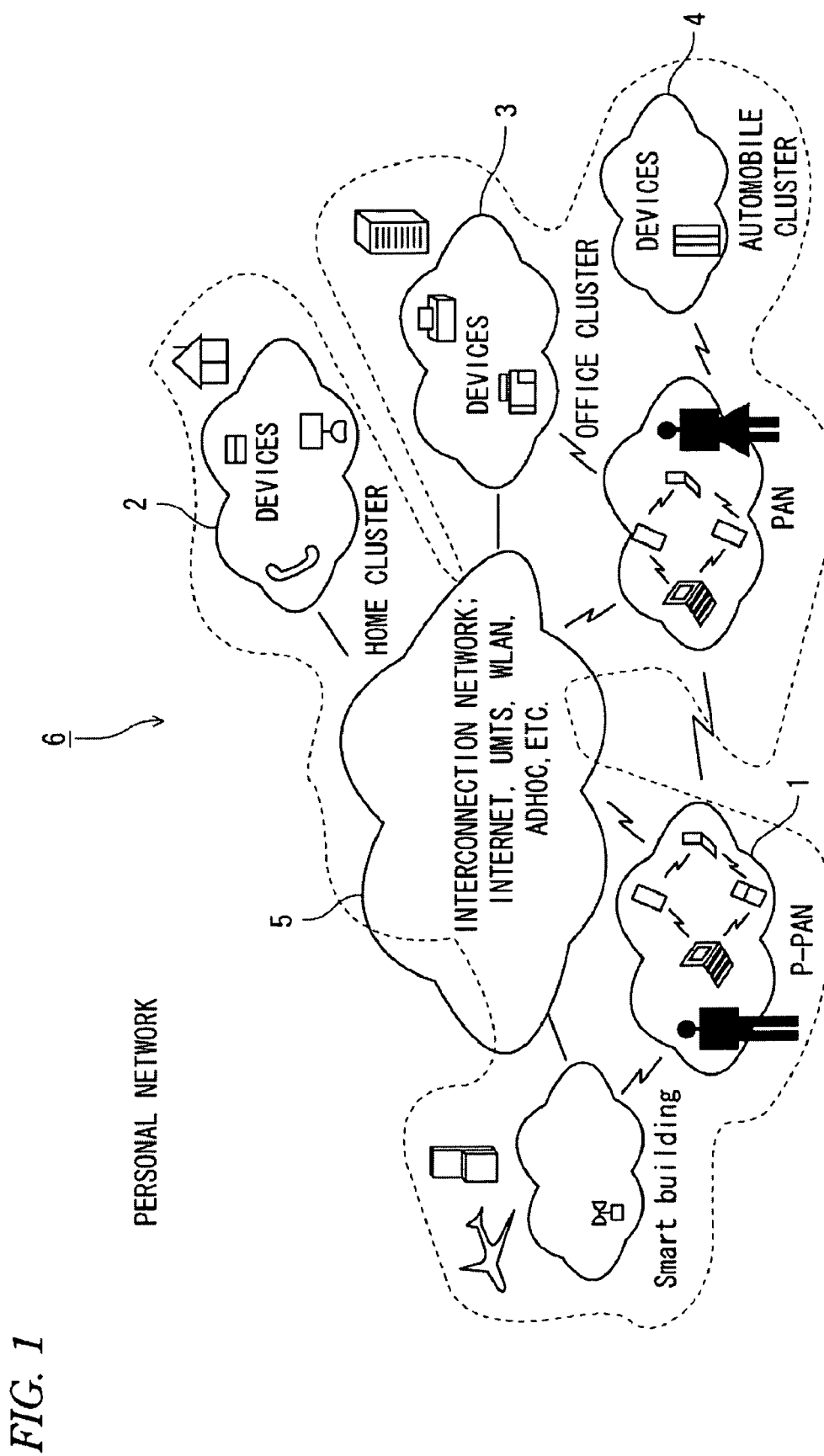
FIG. 1 is a view showing the entire personal network according to the present invention.

Embodiments of the present invention will be described hereinafter based on examples shown in the drawings. The embodiments are not limited by the description given hereinafter.

FIG. 1 will first be used to describe the definitions of the terms "personal network (PN)," "cluster," and "P-PAN (Private Personal Area Network)" used in the present invention.

A commonly used PAN is a Bluetooth, wireless LAN, or other (wireless) link-level network formed by a group of devices that are present near the user. In the present invention, a PAN formed only by the device group of a single user out of consideration for the information of the device owner is referred to as a P-PAN (1).

Within this P-PAN, data can be freely exchanged and accessed on a trusted basis, whereas communication with devices outside the P-PAN is restricted.

In the same manner, small-scale networks are formed only by devices owned by a single user in the same manner in homes, businesses, cars, and other locations where users are present for long periods of time.

These localized collections of devices are referred to as clusters (2), (3), (4). Communication can be performed freely in secure fashion within these clusters, the same as in the P-PAN (1), but communication with devices outside the cluster is restricted.

The P-PAN or clusters are connected by the Internet, a UMTS (Universal Mobile Telecommunications System), a wireless LAN, ad hoc communication, or another interconnection network (5).

Users can thus access all of their own devices or data without regard to location by connecting through a secure method using a VPN (Virtual Private Network), for example, according to need.

From the perspective of the user, the devices present in clusters (2), (3), and (4) can also be simply handled as on-hand, i.e., as existing within the P-PAN. This imaginary network composed of the P-PAN and clusters is referred to as the personal network (PN) (6).

The configuration of the name system as a characteristic feature of the present invention will next be described.

As previously mentioned, device names registered in a DNS server are public for all users, and registering the names of all devices cannot be considered preferable from a security standpoint.

Figure 2:
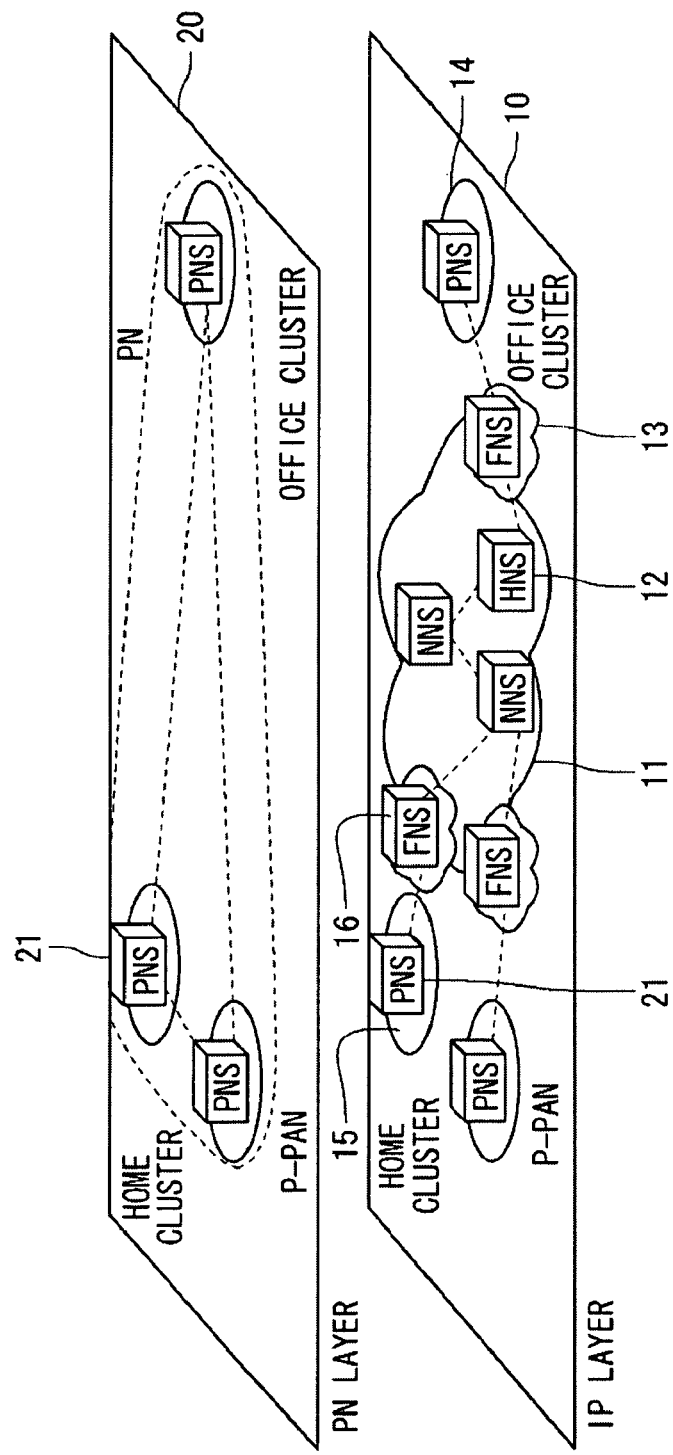
FIG. 2 is a block diagram showing the relationship between the IP layer and the PN layer of the present invention.

Therefore, the name space possessed by the DNS is divided into two name system layers, wherein one name system layer is separated into a name space (second name system layer) accessible only by the user himself, and the other name system layer is separated into a name space (first name system layer) for registering only devices for which access from another party is permitted. The former name system layer is referred to as the PN layer, and the latter name system layer is referred to as the IP layer. FIG. 2 is a view of the entire system.

The IP layer (10) is, specifically, the current DNS architecture as such. The names of devices that accept access from other parties are registered in a hierarchical name space, and are globally effective.

The PN layer (20) is composed of a name space that is accessible only to the user himself. Specifically, only one IP layer (10) exists globally, but one PN layer (20) exists for each user.

The fact that the PN layer (20) forms a name space for each user has merits other than those of security. Since the name spaces of each user are independent, the use of the same device name by more than one user presents no problems. For example, the names "TV," "PC," "printer," and the like are intuitively recognizable, and therefore may be used by large numbers of users. Since the name spaces of user A and user B are independent, both users can assign the name "PC" to their own personal computers without problems, and the address of each different PC can be bound.

However, this is true only for the PN layer (20), and there must be independence at the FQDN (Fully Qualified Domain Name; name that also includes a domain name) level in the IP layer (10).

In other words, when user A and user B belong to the same domain and open their own personal computers so as to accept access from the other party, non-duplicate names must be given to each personal computer.

In FIG. 2, the PNS (Personal Name Server) placed in each cluster is the name server of the present invention. All the devices in a cluster are equipped with an inter-device communication unit provided with a subset program as described hereinafter, and a device in the cluster that has relatively large resources (e.g., a personal computer or a mobile telephone terminal) is designated to function as the server.

Other devices are made to function as clients. In particular, the devices that operate as servers are PNS devices. The PNS (21) of the home cluster is a personal computer located in a home, for example, and communication terminals, televisions, air conditioners, and various other devices in the home are client devices.

In the IP layer (10), the PNS connects to the function addition name server in the present invention. The function addition name server is composed of a combination of a basic portion having the fundamental function of a DNS, and an extended portion in which an additional function is implemented. The same behavior as that of an existing DNS server occurs if the extended portion is not used.

Since it is practically impossible to replace all the DNS servers on the Internet with function addition name servers at one time, the configuration described above is also effective in the case of an incremental transition.

The function addition name server is referred to as an NNS (New Naming Scheme) server. NNS servers are arranged hierarchically in the same manner as current DNS servers. Numerous NNS servers are deployed on the Internet (11), but the HNS (Home Name Server) (12) in FIG. 2 is the NNS server of the domain usually used by the user.

The FNS (Foreign Name Server) (13) is the NNS server in the domain to which the P-PAN of the user is connected when connected to the Internet (11), and manages the name information of the device of the Internet provider, for example.

Consequently, the FNS (13) of the company domain is used when the user is in the office cluster (14), and the FNS (16) of the home Internet provider is used when the user is in the home cluster (15).

The term "NNS server" refers in general to a name server provided with the functions of the present invention such as described above, and the HNS and FNS are described using different names merely to distinguish the relationship thereof to the user, and have the same configuration. The functions of the inter-device communication unit of the PNS described above are a subset of the functions of an NNS server.

Figure 3:
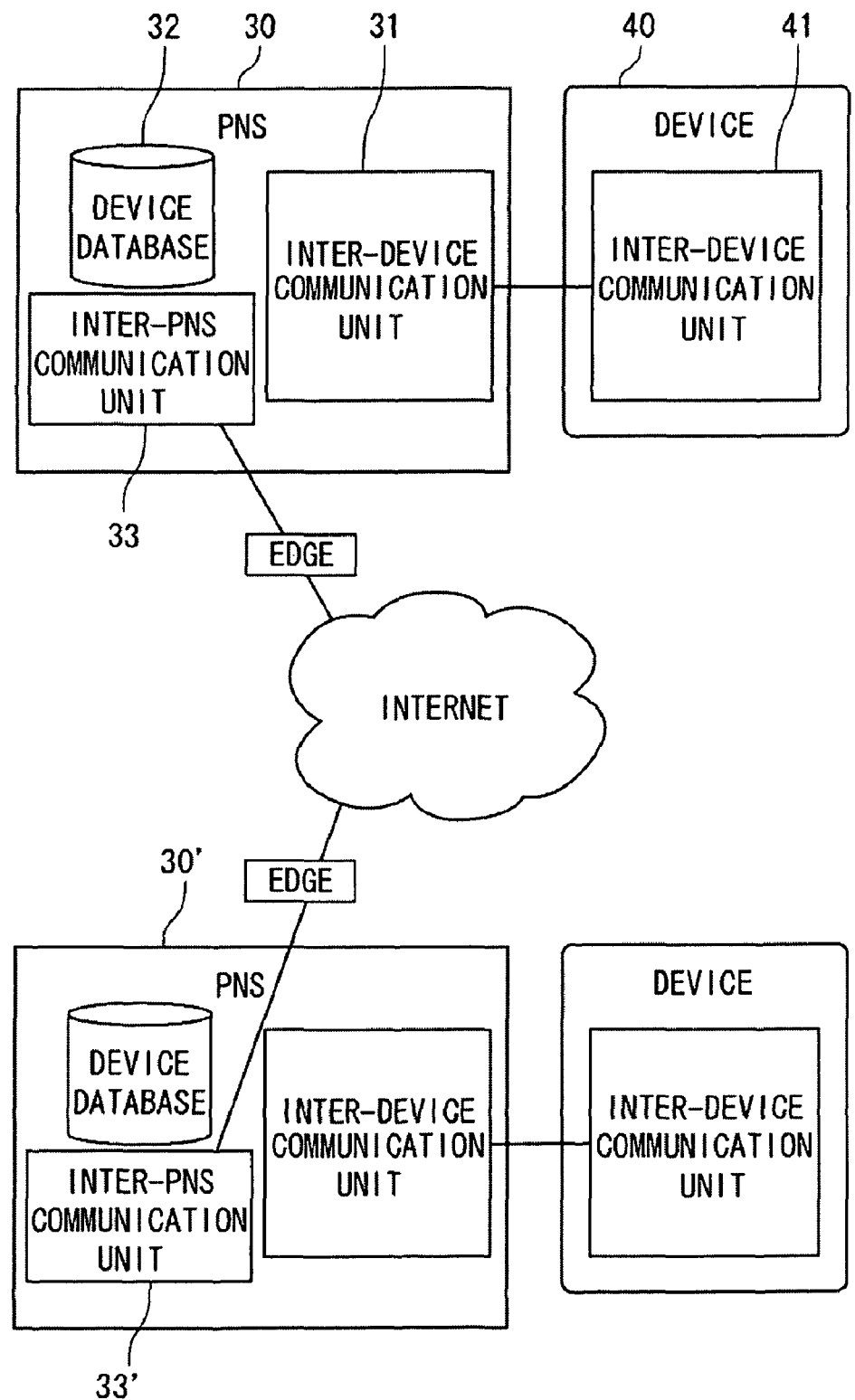
FIG. 3 is a block diagram showing the structure of the PNS and devices relating to the PN layer.
Figure 4:
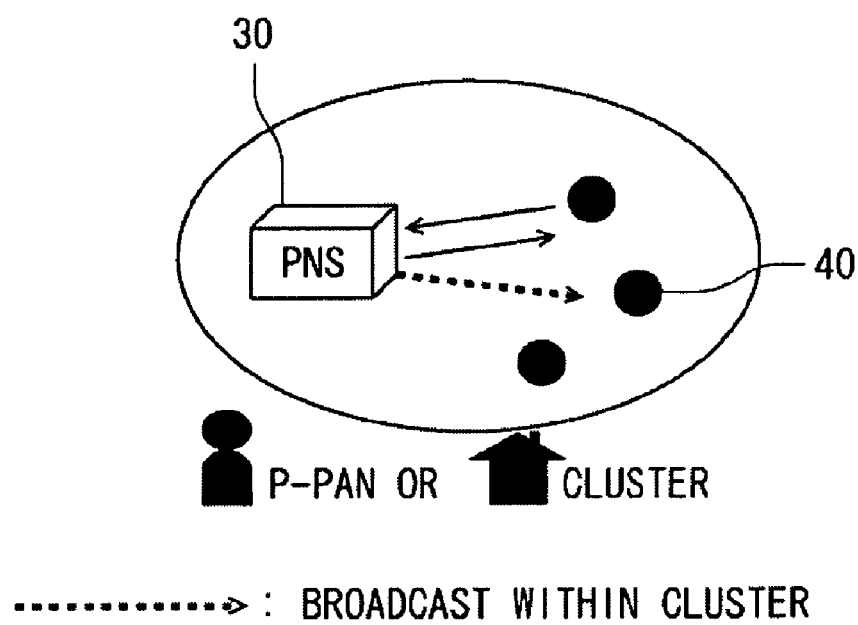
FIG. 4 is a view showing the relationship between the PNS and the devices in a cluster.
Figure 5:
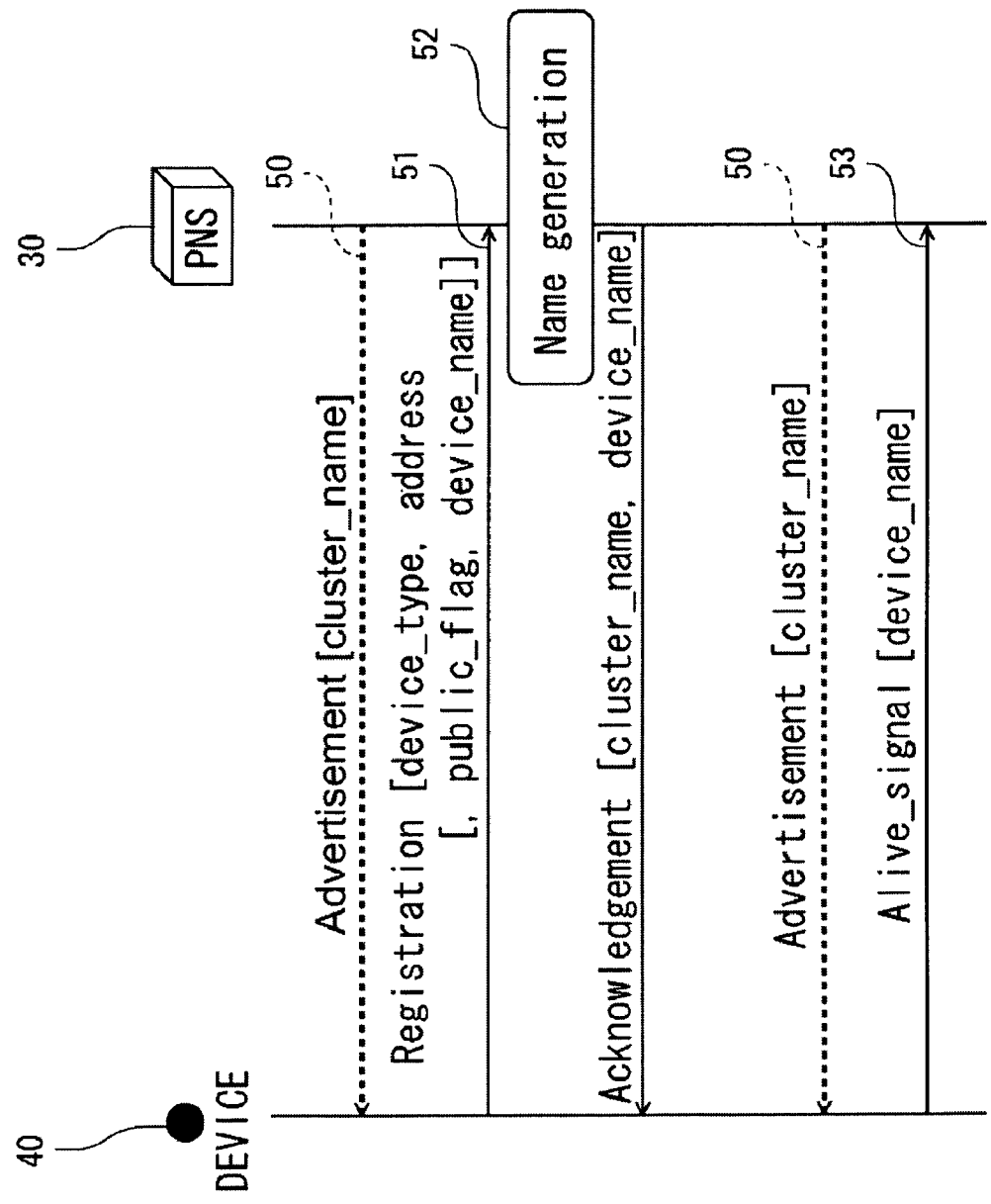
FIG. 5 shows the flow of messages between the PNS and devices in the cluster.

FIG. 3 is a block diagram showing the structure of each server device in the present invention. FIG. 4 shows the relationship between the PNS and devices in a single cluster. FIG. 5 shows the flow of messages between the PNS and the devices.

The PNS (30) functions as a so-called master node in the P-PAN/cluster (31). The PNS (30) periodically broadcasts (50) an advertisement packet (advertisement) in the P-PAN/cluster thereof from the inter-device communication unit (31), and communicates the presence of the PNS (30) to the other device (40).

This advertisement packet includes ID information (cluster_name) specific to the P-PAN/cluster thereof. This cluster_name is preferably set manually (e.g., to a name easily recognizable by the user, such as "home," "office," or the like).

Devices that do not serve as PNS servers register the information thereof in the PNS by the client function of the inter-device communication unit (41). A client knows which P-PAN/cluster the client is in from the cluster_name broadcast by the PNS.

When registration has not yet taken place in any PNS, such as immediately after the power is turned on, or when it is detected that a device has moved to a new P-PAN/cluster, the inter-device communication unit (41) transmits (51) a registration packet to the PNS (30).

The registration packet must include the type (device_type) of the device (item (1)) and an IP address (address) (item (2)). The user may also indicate a device public flag (public_flag) (item (3)) when the user wishes to disclose his device to another party, and since numerous devices are connected to the network, the names of the devices are preferably assigned automatically for the sake of convenience, but the user may indicate a device name (device_name) (item (4)) when the user wishes to assign an arbitrary name. Items (1) and (2) are essential, and (3) and (4) are optional, but when the public flag (3) is on, it is essential that the device name (4) be set to ensure that the device name is unique. According to this procedure, the PNS (30) obtained information for all the devices (40) in the P-PAN/cluster thereof, and stores the information in a device database (32).

In the obtained information, automatic generation (52) of names may be performed for devices that do not have a set (4) arbitrary name. Names in the format "device_type serial_number.cluster_name" may be generated using the cluster_name and the (1) device type information. Specifically, names such as "tv01.livingroom" or "printer03.office" are generated.

Since the device type and location information are included, names are obtained that are easily recognizable by the user.

The serial number is for preventing name duplication when devices of the same type are present in the P-PAN/cluster, and is not essential when there is no name duplication. When duplication is prevented using serial numbers such as in the names "tv01" and "tv02," it is difficult to identify which of the two televisions is referred to by "tv01." More detailed device information is preferably obtained in coordination with a service discovery function, a context management technique, or the like, and the maker name, display size, or other distinguishing characteristic between the two devices is incorporated into the name.

Once a client is registered in the PNS, notification (alive signal) (53) is periodically issued to the PNS at a low frequency insofar as there are no changes or movement.

A binding list of the device names and addresses obtained by the process described above is stored for a specified period of time by the PNS. When the alive signal expected to be periodically received from a device is not received in the specified period of time, the PNS determines that the device has moved or is no longer active (e.g., the battery is exhausted), and deletes the device from the list (device DB).

Figure 6:
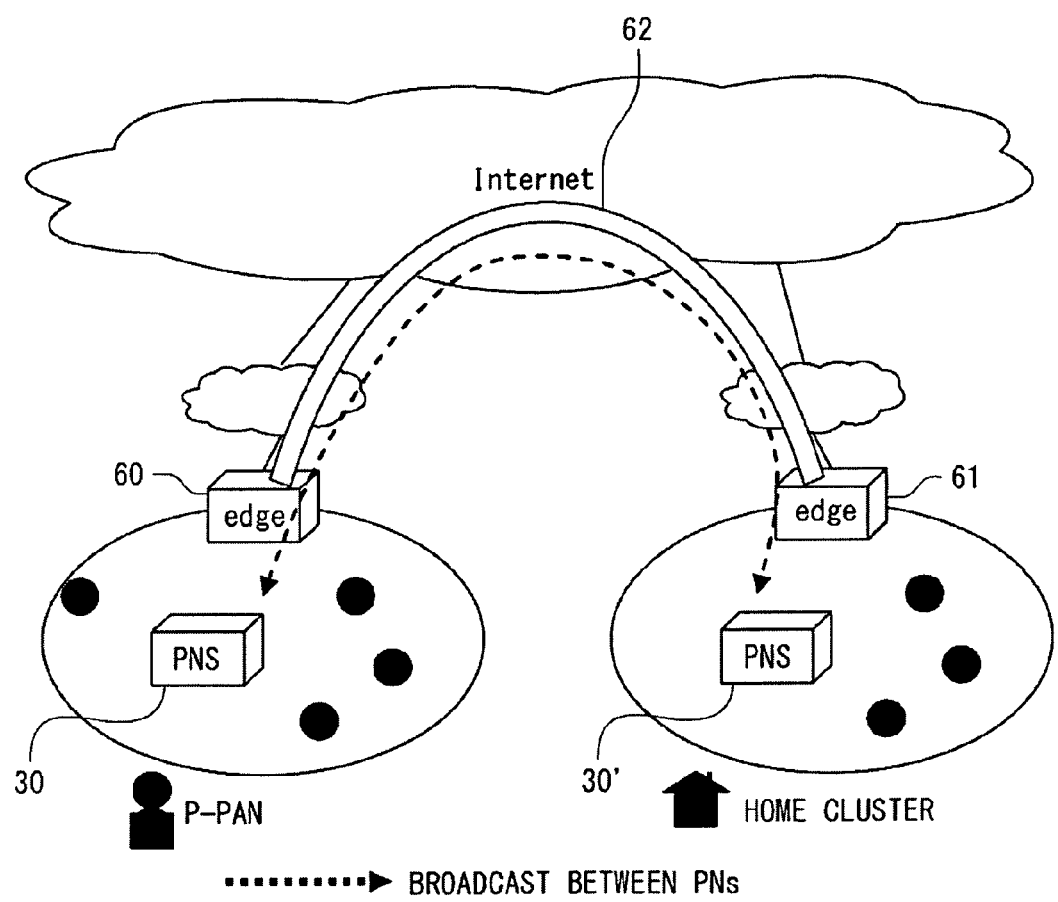
FIG. 6 is a view showing the relationship between PNS in the PN layer.
Figure 7:
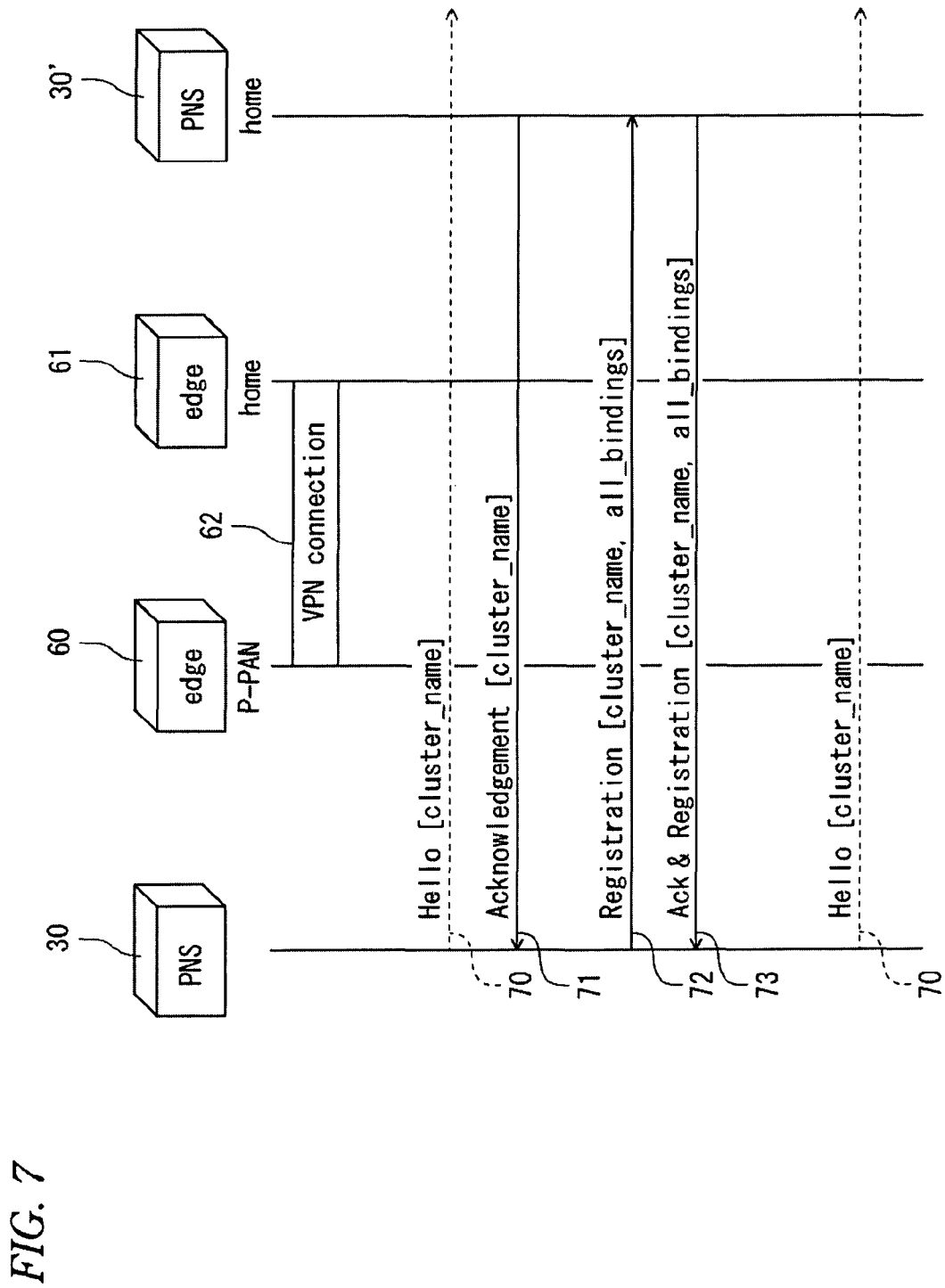
FIG. 7 shows the flow of messages between PNS in the PN layer.

The device information gathered by the PNS (30) in this manner is shared among the PNS units in the PN layer for use by the user himself FIG. 6 is a view showing this inter-PNS communication, and FIG. 7 shows the flow of messages when the information is shared.

Since the PN layers and the name spaces formed by the PN layers have a flat structure, each PNS has an equal relationship. The PN layer naming scheme can thus be described as the manner in which the device information of each PNS is shared.

In the present invention, a proactive scheme is adopted in which the information possessed by each PNS is exchanged in advance with another PNS. Each PNS periodically broadcasts (70) an advertisement packet (hello packet) to the entire PN in order to search for another PNS through the use of an inter-PNS communication unit (33). At this time, the cluster_name of the broadcasting PNS is added to and transmitted with the advertisement packet.

A VPN connection (62) is then established between edges (60), (61) for forming an Internet connection between the PNS, and secure communication is enabled.

The inter-PNS communication unit (33') of the other PNS receiving the broadcast confirms whether the received cluster_name is known or unknown. When the cluster_name is unknown, since the device information of the P-PAN/cluster is not yet known, the device information is mutually exchanged.

Therefore, the PNS (30') that has received the broadcast transmits (71) a response packet (acknowledgement) to the PNS (30) on the transmission side. At this time, the cluster_name of the receiving side is added to the response packet.

After the cluster_name is exchanged on both sides in this manner, the information held by each PNS concerning the devices present in the P-PAN/cluster of each PNS is exchanged. Specifically, when the PNS (30) transmits (72) the cluster_name and the correspondence list all_bindings of the devices and addresses within the cluster, the response and the same information for the receiving side are transmitted in reply (73).

By performing such a procedure between all PNS, each PNS can have complete name space information. In other words, each PNS is able to resolve all queries by itself, and there is no longer a need to transfer queries to another PNS or the like.

When a new device is connected to a P-PAN/cluster, or the device information otherwise changes after exchanging of name spaces is completed, the PNS of the P-PAN/cluster immediately sends the change differential by unicasting (or multicasting if possible) to all the PNS for which information exchange was performed, and each PNS is maintained so as to always have the newest information.

In each PNS, the cluster_name and timer information are added to the exchanged device information and stored in the device DB. Since each PNS regularly broadcasts a hello packet as previously described, when this broadcast cannot be received during a specified period of time (set value of the timer), the information of the devices that are present (or were present) in the corresponding P-PAN/cluster is discarded.

A proactive scheme is used in the present embodiment, but a reactive scheme can have higher communication efficiency in an environment in which few queries occur. A reactive scheme in this case is one in which device information is not exchanged even when the other communicant is made known by a hello packet. When a query occurs, the query is transferred to another PNS and resolved. When a query for the device name "tv01.livingroom," for example, arrives in a case in which names are automatically generated as described above, it is clear that this query can be resolved by referring to the "livingroom" cluster, and high communication efficiency can therefore be anticipated.

Since the PN layer according to the present invention has no relation to the name space of the IP layer, the exchanging of the correspondence list in the PN layer described above has no relation to the hierarchy in the IP layer, and the shared device information can be utilized regardless of which cluster a user moves to.

The present invention furthermore provides a structure that enables a change in the P-PAN to be followed and the P-PAN to be utilized for devices that can be accessed in the IP layer. The IP layer will be described hereinafter.

The name space of the IP layer has a hierarchical structure in the same manner as the name space formed by the existing DNS. All devices belong to a specific domain, thereby enabling distributed administration, and since a name itself includes a hierarchical structure, the name server of the domain to which a device belongs can be reached by an iterative query.

At present, the majority of devices on the Internet that are registered in DNS are static and almost unchanging. A structure (Non-patent Document 4) has been proposed/implemented that can dynamically update DNS registration for dialup users and other users whose assigned IP address dynamically changes, but the expected frequency of updating is not especially high.

[Non-patent Document 4]: P. Vixie, et al., "Dynamic Updates in the Domain Name System (DNS UPDATE)," *IETF RFC* 2136, April 1997.

A next-generation network must also accommodate high-mobility services such as mobile telephone services. In cases in which a device moves at a high speed while the connection point to the network changes, the IP address of the device is frequently updated, and frequent updating is expected in the name server as well. There is a need for a naming scheme that is able to withstand such frequent updating of binding.

Since devices registered in the IP layer of the NNS can be referenced by all users, only the minimum necessary devices should be registered; i.e., only devices for which access from other parties is permitted should be registered. Therefore, only devices for which the "device public flag" transmitted from the inter-device communication unit (41) of the device (40) is set to "on" are registered.

The user must set a specific name (e.g., "pc01") for a device whose public flag is on.

The user combines the name with the domain name (e.g., "nict.go.jp") of the user's so-called home network, and a device-specific FQDN ("pc01.nict.go.jp" in the case of this example) is obtained.

In other words, when someone tries to access "pc01.nict.go.jp," the user is resolved from the information recorded in the name server of the "nict.go.jp" domain.

Figure 8:
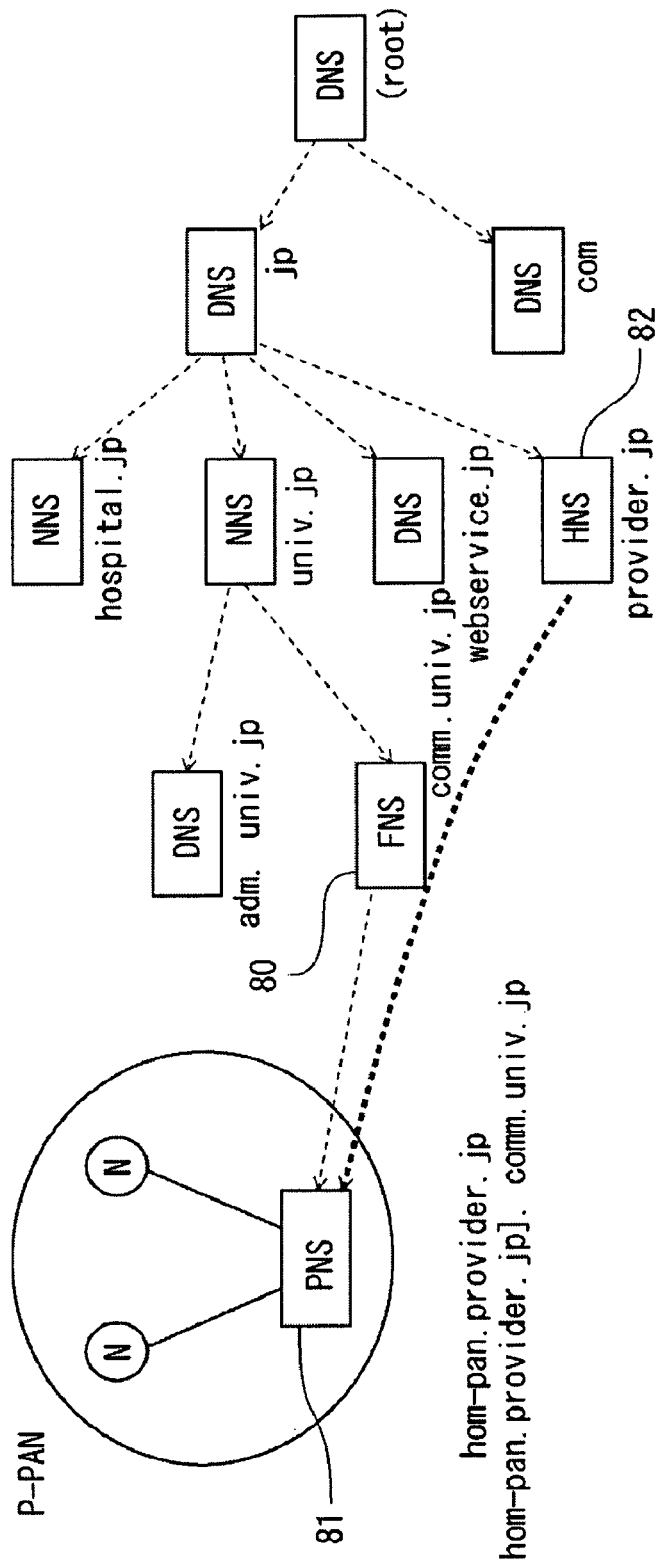
FIG. 8 is a view showing the entire structure of the servers and name spaces in the IP layer.

As described above, the NNS for managing the domain of the user's home network is the HNS. FIG. 8 shows the structure of the name server and name space of the IP layer.

The principle is that when the IP address of a device has changed, the PNS transmits the newest address information (correspondence list) to the HNS, whereby the binding recorded in the HNS is updated.

However, when the HNS and the PNS are far apart in the network, or when the transmission speed of the circuit linking the P-PAN with the Internet is low, performing frequent binding updates can cause bandwidth that is meant for data transfer to be occupied by updating. A solution to this problem must be found.

The NNS server (referred to as the FNS as described above) of the network (attaching network) to which the P-PAN/cluster is connected therefore operates in coordinated fashion.

Instead of the binding updating originally performed between the PNS and HNS, binding updating is performed between the PNS and FNS.

Coordination is therefore needed between the HNS and FNS. The FNS notifies the HNS of the FNS address and the device names in the P-PAN/cluster for which the FNS is receiving updates by proxy.

Figure 9:
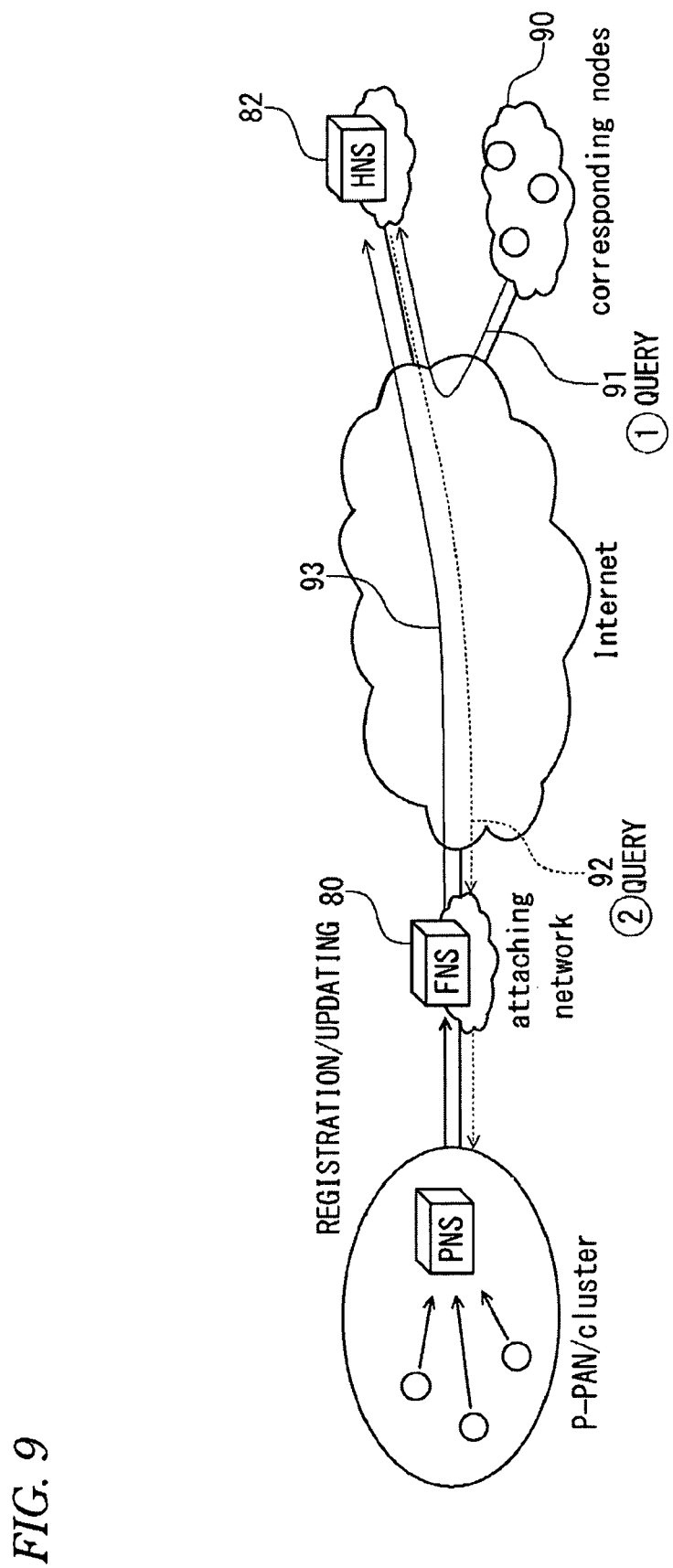
FIG. 9 is a view showing the relationship between the servers in the IP layer.

As shown in FIGS. 8 and 9, the devices in the P-PAN connected to the Internet via the comm.univ.jp domain are accommodated by the name server (81) of the domain thereof, and even when the user's home network is the provider.jp domain, information indicating connectivity is not accommodated in the name server (82) of the provider.jp domain.

In the present invention, the PNS (81) regularly transmits the correspondence list (binding) of names and addresses of disclosed devices to the HNS (82), and the binding information is retained in the HNS (82).

Furthermore, when the access-point domain provides NNS server functionality, the NNS server of that domain is used as the FNS (80). The PNS (81) transmits binding information to the FNS (80) in place of the HNS (82) and maintains/updates the information, and the FNS (81) transmits (93) only the FNS (81) address and the device names being proxy-managed to the HNS (82), thereby reducing the administrative traffic flowing on the network.

Figure 10:
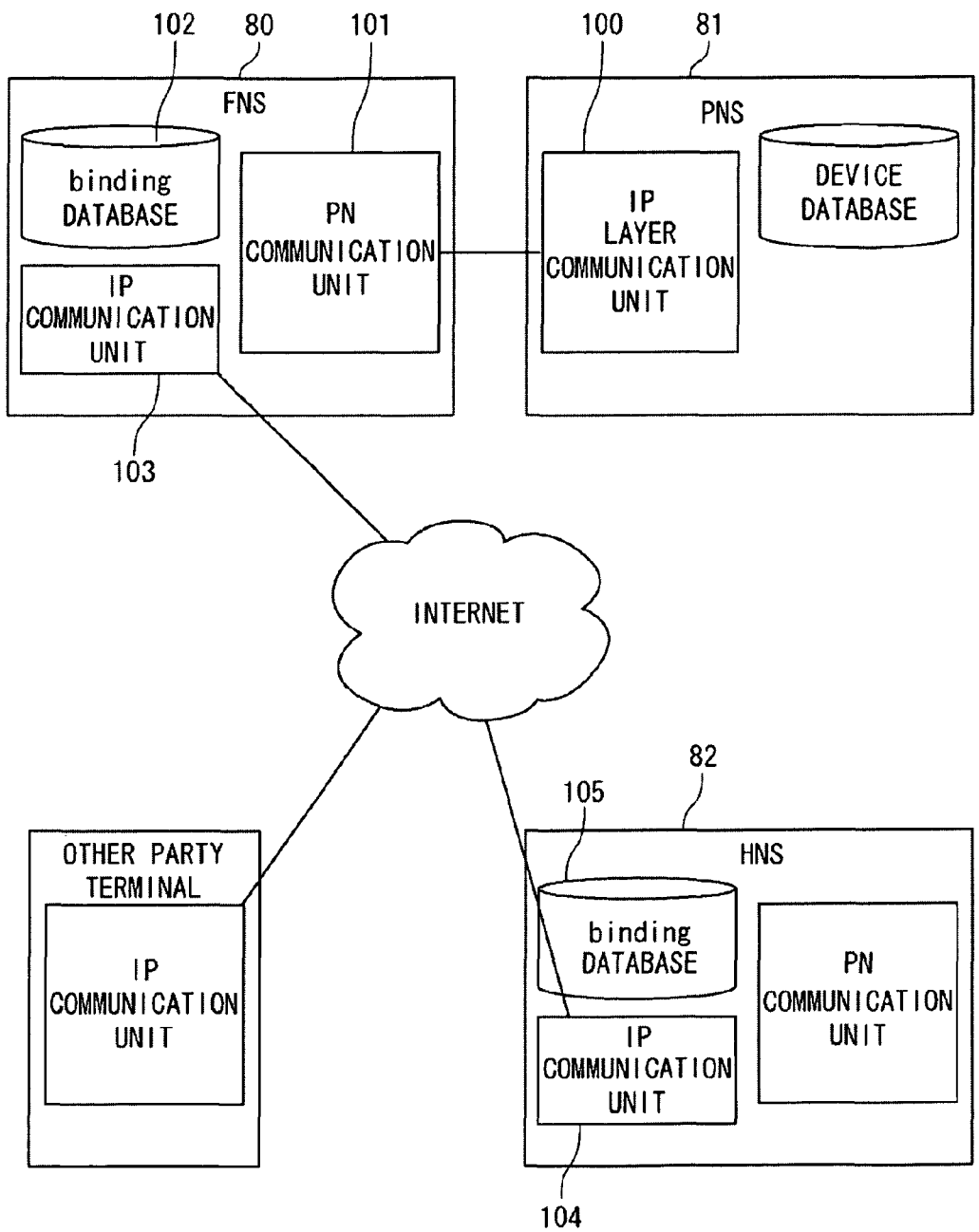
FIG. 10 is a block diagram showing the structure of the servers according to the IP layer.

FIG. 10 is a view showing the configuration of the servers, wherein the information of the device DB created as described above is transmitted from the IP layer communication unit (100) of the PNS (81) to the PN communication unit (101) of the FNS, and the PN communication unit stores the received information in a binding database (102). The IP communication unit (103) notifies the IP communication unit (104) of the HNS (82) of the address and device name of the FNS via the Internet, and the IP communication unit (104) stores the address and device name in the binding database (105).

As a result, the initial query (91) first transmitted by the user (corresponding node) (90) who wishes to access the public device can reach the HNS (82), as shown in FIG. 9. In order to deliver the query (91) to the FNS (80), the HNS issues notification of the IP address of the FNS as the name server to be subsequently referenced, whereby the corresponding node (90) is caused to issue a second-stage query (92).

Specifically, in order to access the device named hom-pan.provider.jp, the corresponding node reaches the provider.jp name server (82), which is the HNS. Instead of returning the address of the device, the HNS (82) causes the name server of the comm.univ.jp domain to which the P-PAN is currently connected, which is the FNS (80), to be accessed. The FNS resolves the actual address of hom-pan.provider.jp.

As shown in FIG. 8, combined presence of conventional DNS servers in the name server structure of the IP layer causes no problems at all. Operation is possible insofar as at least the HNS (82) of the home network and the PNS (81) in the P-PAN/cluster are present, and the FNS may be a function addition server even in a structure in which the FNS is included.

The corresponding node need not support the system of the present invention. This is because, when viewed from the perspective of the corresponding node, queries transmitted to the HNS or FNS, and received responses are performed by exactly the same process as inquiry to a DNS server. The only differences between the DNS and NNS IP layer are the updating structure between HNS, FNS, and PNS; and the addition of another level of querying from HNS to FNS when an FNS is included.

The present invention has such characteristics as those described above, but a technique for furthermore enhancing utility is proposed in which a specified device name is supplemented when a cluster name is not included, or, in the case of a defect, when there is a defect in the device name.

Figure 11:
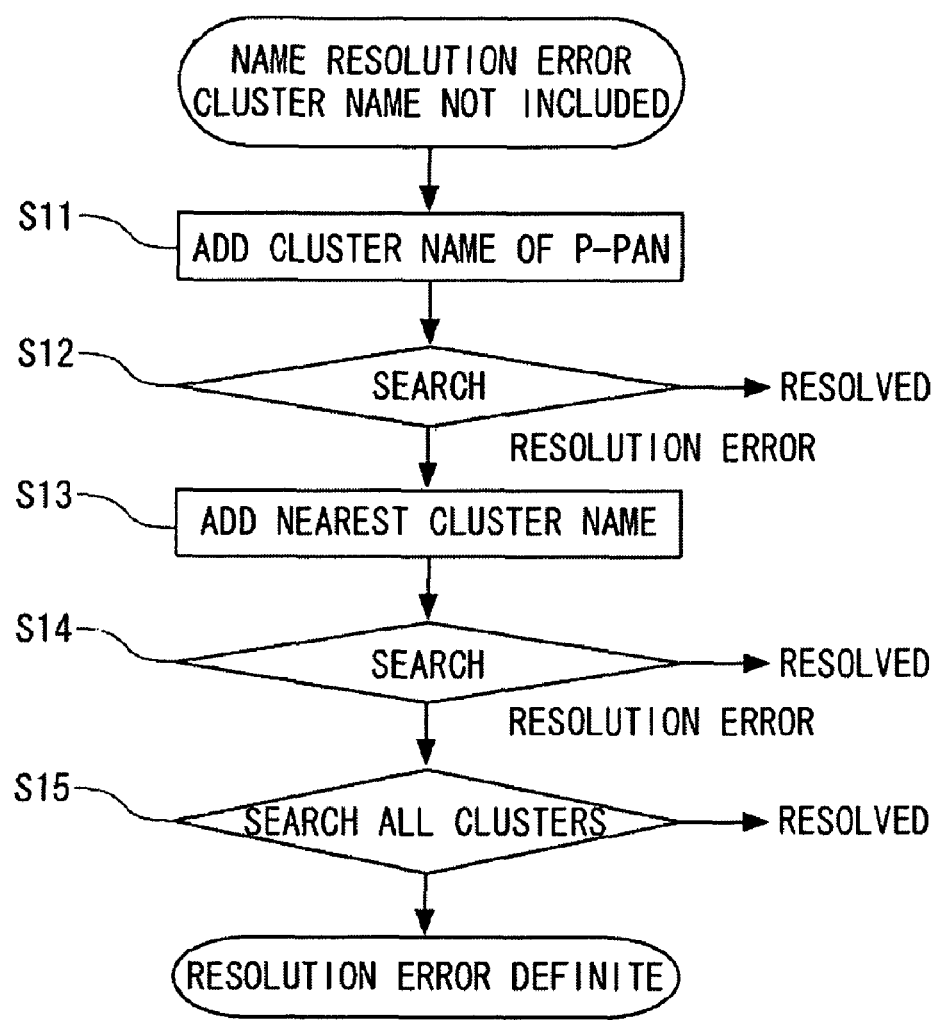
FIG. 11 shows the flow of processing for adapting to a name resolution error due to the non-inclusion of a cluster name.

FIG. 11 is a flowchart showing name resolution in a case in which the cluster name is not included.

When a cluster name is not defined, it can be assumed that the user has intentionally omitted the cluster name. Consequently, it is possible that the uniqueness of the device is guaranteed merely by the device name, or that the user is in the vicinity of the device referred to.

Therefore, the P-PAN is added (S11) to the cluster name, and a search is performed. If the name is resolved as a result (S12) of the search, the process is completed.

If the name is not resolved, the name of the nearest cluster is then added to the cluster name, and a search is performed (S13).

In case the name still is not resolved (S14), all of the remaining clusters are searched to find whether a device that matches the device name is present (S15).

The cluster name can be supplemented according to a procedure such as the one described above, and utility to the user can be enhanced.

In S13, information relating to the closest cluster can be obtained from the functioning of a Context Manager (see Non-patent Document 5) present in the PN architecture.

[Non-patent Document 5]: M. Ghader, et al., "Service Management Platform for Personal Networks," *Proc. Of IST-Summit* 2005, June 2005.

Figure 12:
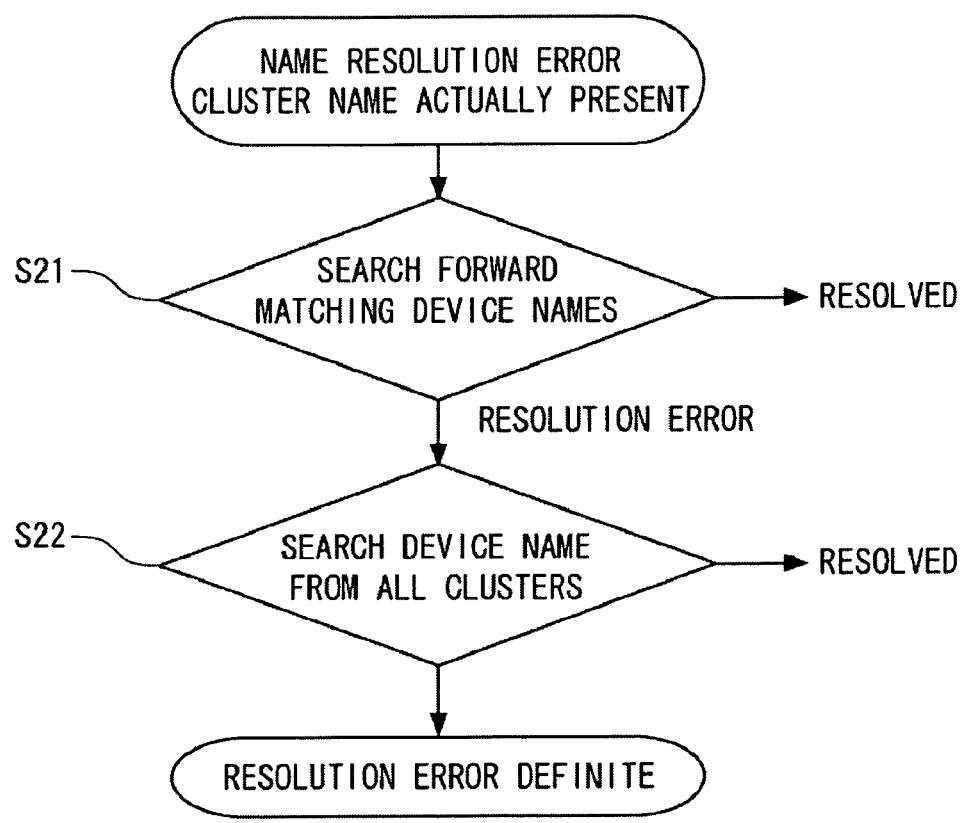
FIG. 12 shows the flow of processing for adapting to a name resolution error caused by a device name.

When the name cannot be resolved in spite of the cluster name portion being correct, it is possible that the device name portion is incorrect, or that a device having the PN device_name is not present in the cluster. FIG. 12 shows the flow of processing in this case.

First, the specified cluster is searched for the device name and forward matching devices (S21). If the name is thereby resolved, the processing is ended.

When the name is not resolved, a search of all other clusters is performed to find whether a device that matches the device name is present (S22).

The purpose of the former procedure is to supplement an ambiguous device name, and the latter procedure is effective when the target device has moved and the cluster name part in the PN device_name is thereby changed.

Figure 13:
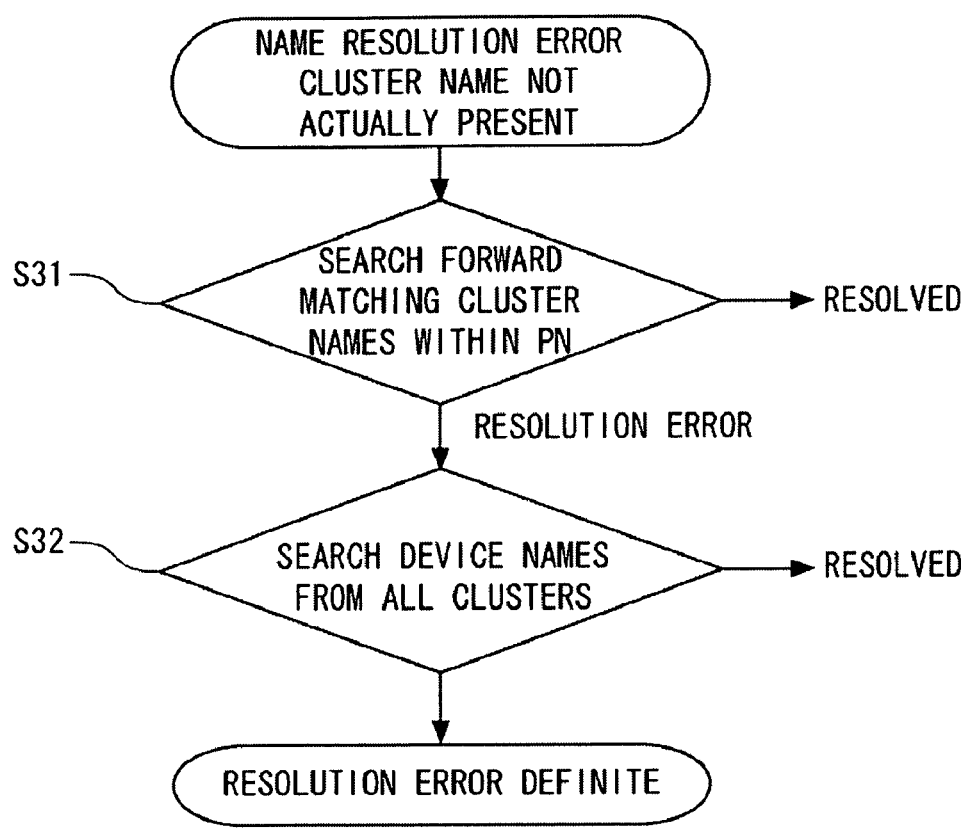
FIG. 13 shows the flow of processing for adapting to a name resolution error due to the nonexistence of a cluster name.

Adaptation can also be made through the processing flow shown in FIG. 13 when the cluster name is incorrect (does not exist).

When the cluster name is incorrect, it is possible that the user has intentionally omitted a portion of the cluster name, or has made a simple spelling error. Therefore, when there is a cluster that forward-matches the specified cluster name in the PN layer, a search is performed using the matching cluster as the target (S31).

When the name cannot thereby be resolved, a search of all the clusters is performed to find whether a device is present that matches the device name (S32).

When the name still cannot be resolved by these routines, a resolution error is determined to have occurred in all cases.

When this type of correction/supplementing is performed on the system side, security problems occur in that the NNS actively reveals the presence of devices, and scalability problems occur due to increased system load.

Since this extension is performed only for name spaces that are independent for each user in the NNS, a PN device_name present in the name space can be referenced only by the user himself.

The abovementioned security issues thus essentially do not present a problem. As for the abovementioned scalability problems, because the number of devices belonging to an individual is not expected to be significantly large, increased search times due to an increased number of devices are not a problem.

However, in the abovementioned steps (S15), (S22), and (S32), queries are issued to a plurality of clusters simultaneously. The following two responses are considered in this situation.

(1) Only the PNS of the cluster in which the device exists returns a response.

(2) The PNS of all the clusters return a response (the response may also be "Not Found").

Response (1) has merit in that the response can be returned with minimum traffic, but has a demerit in that the query is not completed before timeout when the searched PN device_name is not present. Response (2) is therefore preferably selected.

As described above, the present invention provides a naming scheme having two layers, whereby a suitable network environment for a moving user or other party accessing a device is provided while security is ensured.

What is claimed is:

1. A name system for correlating a device and a network address on a communication network, the name system configured so as to form a first name system layer for registering only a device for which access from another party is permitted, and form a second name system layer for registering a device that can be accessed only by a user having specified access authority, wherein:
    a name server device for functioning in both of the name system layers is provided for each cluster defined as a collection of devices for each location in the second name system layer, acquires device registration information that includes at least a network address and type of a device from one or more devices in the cluster, and stores a correspondence list of the devices and addresses in the cluster;
    the name server device has a link for exchanging the correspondence list with a name server device of another cluster within the second name system layer, and enables the user having specified access authority to access a device of any cluster;
    in the first name system layer, the name server device connects to a function addition name server device constituting a hierarchical domain, and provides the correspondence list for a device for which access from another party is permitted in the second name system layer;
    access to a device belonging to the domain, is attained by the other party through device/network address conversion of the function addition name server device;
    the name server device provides a correspondence list for a device for which access from another party is permitted, to a home access-point name server device in the form of a home name server device, which is the function addition name server device for managing a domain of a home network to which a user belongs, and a foreign access-point name server device, which is the function addition name server device to which said name server device of the cluster in which the user is currently positioned is connected, wherein said home and foreign access-point name servers are different from each other in said first name system layer, wherein said name server device of the cluster in which the user is currently positioned is configured to move between the home and foreign access-point name server;
    the foreign access-point name server device transmits its network address and information of a device that received the correspondence list, to the home name server device; and
    the home name server device notifies the other party of the network address of the foreign access-point name server device when access to a device addressed to the home name server device has occurred.

2. The name system in a communication network according to claim 1, wherein:
    said device registration information includes a public setting flag for setting whether the device is disclosed in the first name system layer, and a device name of the device at the time of disclosure.

3. The name system in a communication network according to claim 1, wherein:
    said name server device comprises supplementing a cluster name in the second name system layer when a defect is present in a received cluster name.

4. The name system in a communication network according to claim 1, wherein:
    said name server device comprises supplementing a device name existing in a specified cluster in the second name system layer when a defect is present in a received device name.

5. A naming method for correlating a device and a network address on a communication network, the naming method configured so as to form a first name system layer for registering only a device for which access from another party is permitted, and form a second name system layer for registering a device that can be accessed only by a user having specified access authority; said naming method in a communication network comprising the steps of:
    providing a name server device for functioning in both of the name system layers for each cluster defined as a collection of devices for each location in the second name system layer, acquiring device registration information that includes at least a network address and type of a device from one or more devices in the cluster, and storing a correspondence list of the devices and addresses in the cluster;
    exchanging the correspondence list with a name server device of another cluster within the second name system layer, and enabling the user having specified access authority to access a device of any cluster;
    connecting to a function addition name server device constituting a hierarchical domain in the first name system layer, and providing the correspondence list for a device for which access from another party is permitted in the second name system layer;
    enabling access to a device belonging to the domain from the other party to be attained through device/network address conversion of the function addition name server device;
    the name server device providing a correspondence list for a device for which access from another party is permitted to the access-point name server device in a case in which a home name server device, which is the function addition name server device for managing a domain of a home network to which a user belongs, and the access-point name server device, which is the function addition name server device to which said name server device of the cluster in which the user is currently positioned is connected, are different from each other in said first name system layer; and the access-point name server device transmitting the network address of the access-point name server device and information of a device that received the correspondence list to the home name server device, and the home name server device notifies the other party of the network address of the access-point name server device when access to a device addressed to the home name server device has occurred.

6. The naming method in a communication network according to claim 5, wherein:

said device registration information includes a public setting flag for setting whether the device is disclosed in the first name system layer, and a device name of the device at the time of disclosure.

7. The naming method in a communication network according to claim 5, wherein:

said name server device supplements a cluster name in the second name system layer when a defect is present in a received cluster name.

8. The naming method in a communication network according to claim 5, wherein:

said name server device supplements a device name existing in a specified cluster in the second name system layer when a defect is present in a received device name.

* * * * *